United States Patent [19]

Pittman

[11] Patent Number: 4,848,735
[45] Date of Patent: Jul. 18, 1989

[54] GEAR BOX FOR RACK AND PINION JACK AND METHOD OF MAKING SAME

[76] Inventor: Jerry W. Pittman, P.O. Box 610149, Dallas, Tex. 75261

[21] Appl. No.: 98,966

[22] Filed: Sep. 21, 1987

[51] Int. Cl.[4] .............................................. B60S 9/02
[52] U.S. Cl. ................................... 254/420; 254/425; 254/427; 254/95; 254/96; 254/97
[58] Field of Search ................... 254/11, 12, 6 R, 229, 254/230, 231, 420, 425, 427, 95, 96, 97; 269/225, 226, 227

[56] References Cited

U.S. PATENT DOCUMENTS

| | | | |
|---|---|---|---|
| 1,304,358 | 5/1919 | Norlund | 254/97 X |
| 1,324,721 | 12/1919 | Benedict | 254/97 X |
| 1,850,513 | 3/1932 | Murphy | 254/95 X |
| 3,466,011 | 9/1969 | Hewes, Jr. et al. | 254/97 X |
| 3,921,958 | 11/1975 | Brockelsby | 254/420 X |
| 3,934,852 | 1/1976 | Weber et al. | 254/97 X |

OTHER PUBLICATIONS

Fulton Manufacturing Corporation; Milwaukee, Wis., "Trailer Jacks, Owner's Manual, Model No. 650 and 675", Hammerblow Jacks, Rack & Gear Type.

Primary Examiner—William L. Sikes
Assistant Examiner—Brian M. Healy
Attorney, Agent, or Firm—Crutsinger & Booth

[57] ABSTRACT

A tongue mounted rack and pinion jack for a trailer wherein a pair of die-cast gear box segments are bolted together for supporting a handle driven worm gear and a pinion gear in self-contained bearing surfaces formed in the gear box segments. When the gear box segments are secured together a gear box, a rack receiving passage and a leg receiving passage are formed therein. A common wall formed in the molded gear box segments separates the gear box from the rack receiving passage and has a window formed therein through which teeth on a pinion gear extend into the rack receiving passage and engage teeth on a rack extending longitudinally through the rack receiving passage and secured to a leg extending through the leg receiving passage.

5 Claims, 3 Drawing Sheets

GEAR BOX FOR RACK AND PINION JACK AND METHOD OF MAKING SAME

TECHNICAL FIELD

The invention is a gear box for a rack and pinion jack of the general type commonly referred to as tongue-mount jacks for elevating and supporting the tongue of a trailer.

BACKGROUND OF INVENTION

Tongue mounted jacks heretofore devised for trailers generally comprise a pinion gear rotatably mounted in a housing and manually rotated by a handle driven worm gear engaging the teeth of the pinion gear. The worm and pinion are mounted in a housing having an opening formed therein through which a tubular leg member having a rack gear secured thereto extends. The pinion gear engages teeth on the rack gear for moving the tubular member through the housing when the crank handle on the worm gear is rotated. A typical tongue mount jack designated "Jack Model No. 650" is commercially available from Fulton Manufacturing Corporation of Milwaukee, Wis.

Gear box housings for tongue-mount jacks heretofore devised have comprised forged steel housing segments welded or bolted together to encase the worm gear, pinion and a sleeve portion through which the tubular leg of the jack extends. The variance and tolerance of the forged steel housing parts was extremely imprecise. When the non-precision parts were welded or otherwise secured together, the resulting housing often failed to meet manufacturing specifications which resulted in a significant number of unacceptable jacks which were rejected for failing to meet quality standards. Installation of bearing elements for the handle driven worm gear and the pinion gear was required before final inspection. Gears and bearing surfaces in the welded gear box were not amenable to repair.

The forged steel gear box housings of tongue mounted jacks heretofore devised tended to rust and corrode unless plated or coated with zinc or other protective materials which increased production costs.

SUMMARY OF INVENTION

The gear box for a rack and pinion jack disclosed herein comprises die-cast aluminum gear box segments bolted or otherwise secured together to provide an inexpensive gear box housing of precision formed non-corrosive parts which almost totally eliminates rejection of jacks for failure to meet quality standards.

The segments of the gear box are die-cast in precision molds such that the parts are interchangeable and can be mass produced. The necessity for machining or otherwise finishing the parts is eliminated. The housing segments are preferably bolted together to eliminate welding or other manufacturing processes which tend to warp parts of the gear box housing and to permit disassembly of the housing for repair and maintenance of internal gears and bearing surfaces.

A cavity in the gear box housing is packed with grease during the assembly operation such that the jack is substantially maintenance free. Self-contained bearings formed in the housing are formed to provide more bearing surface than has been available in prior devices.

BRIEF DESCRIPTION OF THE DRAWING

Drawings of a preferred embodiment of the invention are annexed hereto so that the invention may be better and more fully understood, in which.

Numeral references are employed to designate like parts throughout the various figures of the drawing.

DESCRIPTION OF A PREFERRED EMBODIMENT

Figure 1:
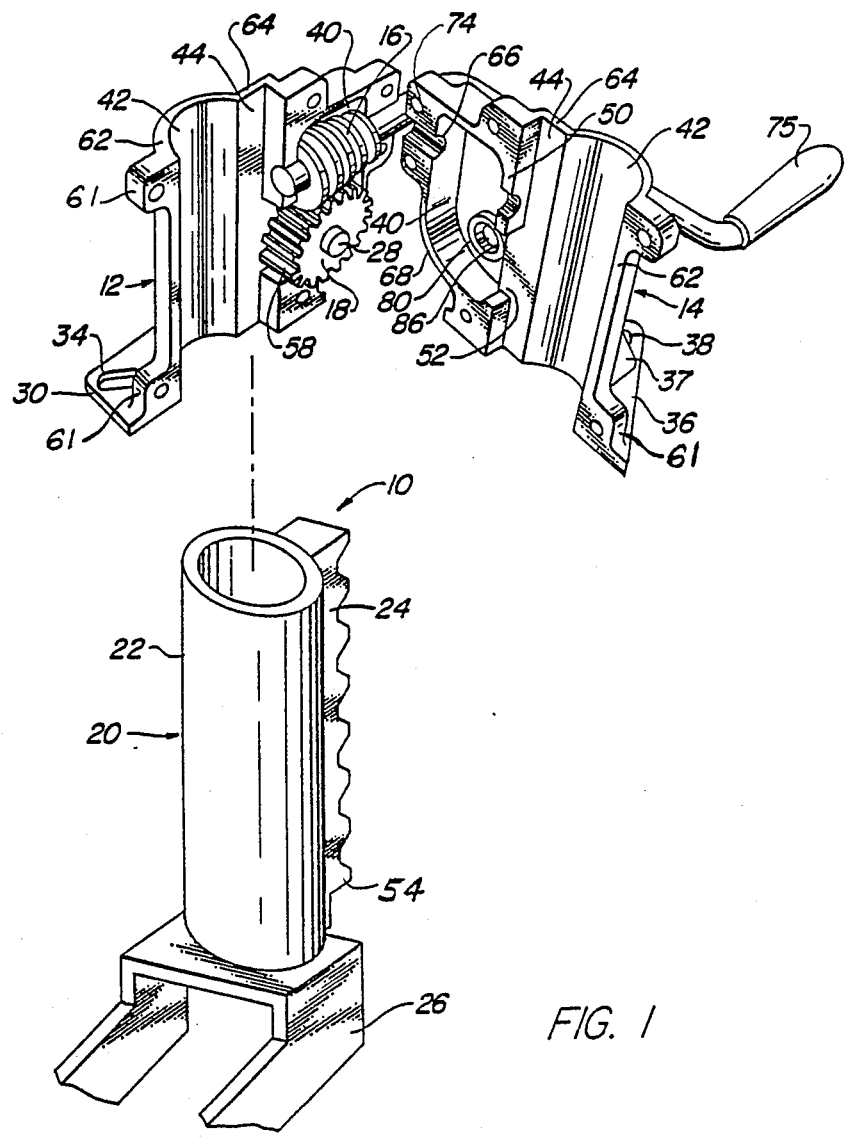
FIG. 1 is an exploded perspective view of a rack and pinion jack.
Figure 2:
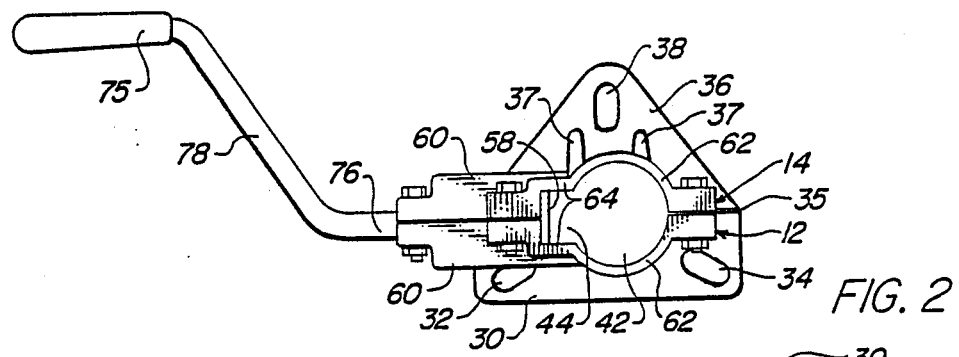
FIG. 2 is a top plan view of a die-cast gear box.

In FIG. 1 of the drawing, the numeral 10 generally designates a rack and pinion jack comprising a pair of die-cast molded gear box segments 12 and 14 encasing a handle driven worm gear 16 drivingly connected to a pinion gear 18 for controlling movement of a support leg assembly 20. Support leg assembly 20 is of conventional design and is commercially available from Fulton Manufacturing Corporation of Milwaukee, Wis. as part of a jack designated "Jack Model No. 650".

Jack leg assembly 20 comprises a hollow tubular leg 22 to which a rack gear 24 is secured. A caster yoke assembly 26 is rotatably secured to the lower end of tubular leg 22 and engages the ground when tubular leg 20 is extended for elevating the tongue of a trailer. If it is deemed expedient to so, caster assembly 26 may be replaced with a cylindrical disc or other suitable foot for supporting the lower end of tubular leg 22. Leg assembly 20 is of conventional design and no further description thereof is deemed necessary.

Figure 3:
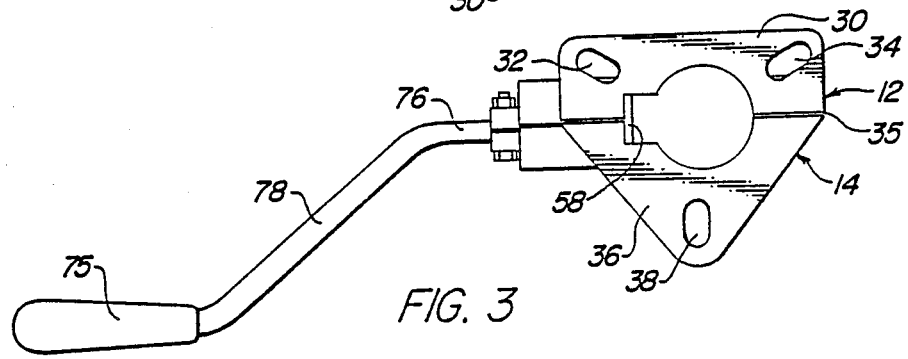
FIG. 3 is a bottom plan view thereof.
Figure 4:
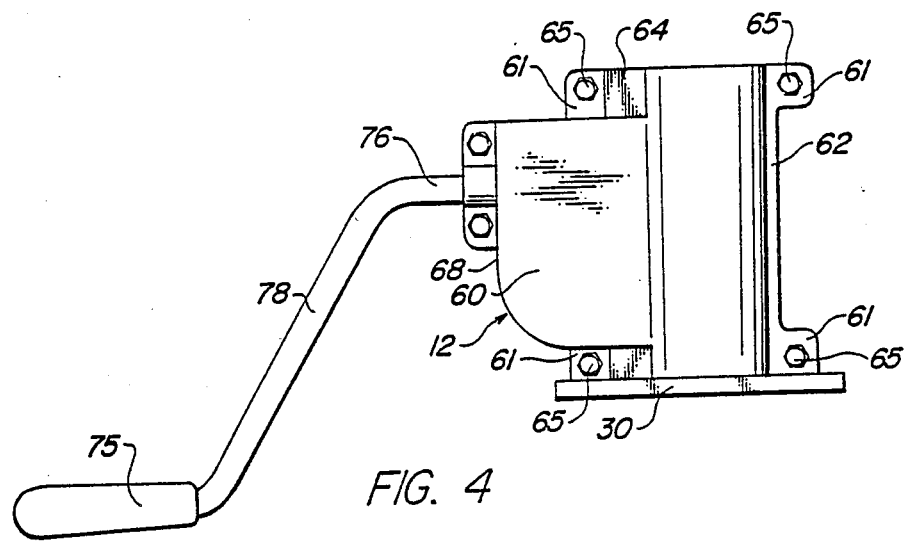
FIG. 4 is an elevational view of the left side thereof.
Figure 5:
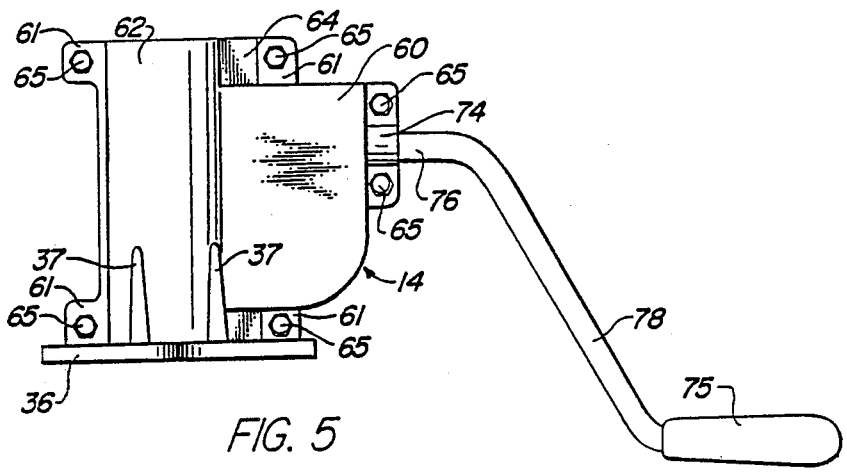
FIG. 5 is an elevational view of the right side thereof.
Figure 6:
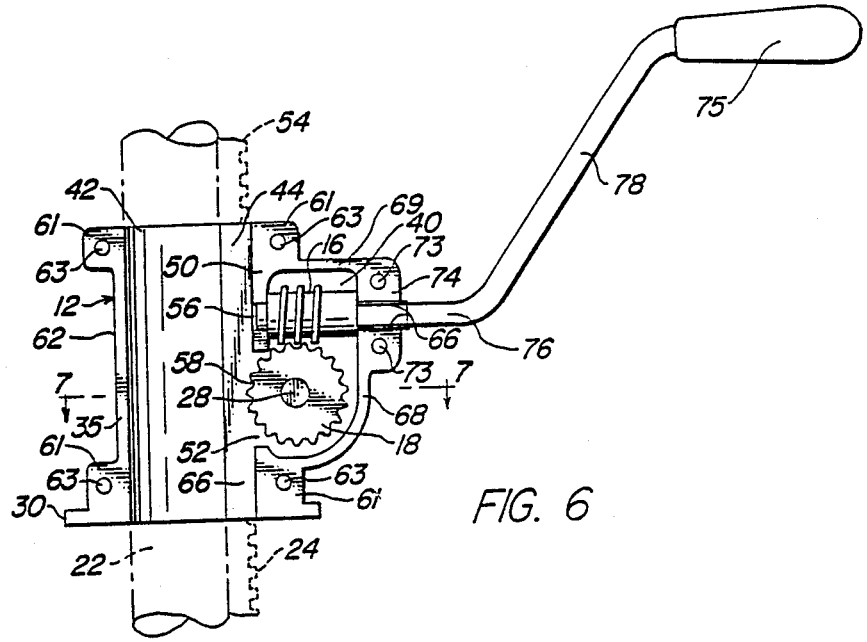
FIG. 6 is an elevational view of the inside of one of the gear segments, the other segment being removed to more clearly illustrate details of construction of the interior of the die-cast gear box segments.
Figure 7:
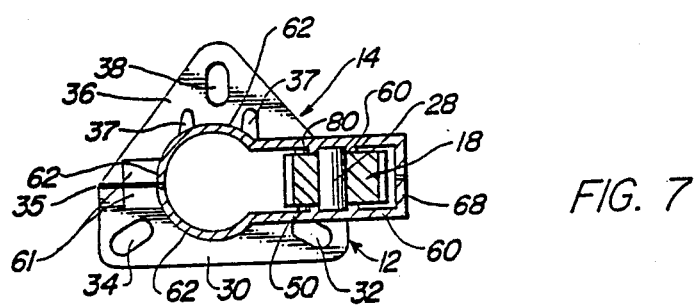
FIG. 7 is a cross sectional view taken along line 7—7 of FIG. 6.

As best illustrated in FIGS. 1, 6 and 7 of the drawing, gear box segments 12 and 14 are of identical construction except for the configuration of mounting flanges 30 and 32. As best illustrated in FIGS. 1 and 3 of the drawing mounting flange 30 on gear box segment 12 has a generally rectangular configuration and is provided with elongated bolt receiving apertures 32 and 34. Flange 36 on gear box segment 14 has a generally triangular configuration and is provided with a single elongated bolt receiving aperture 38. Triangular shaped gussets 37 extend upwardly from mounting plate 36 and intersect with semi-cylindrical wall 62 on gear box segment 14 to provide structural reinforcement.

The provision of three bolt receiving apertures 32, 34 and 38 for securing gear box segments 12 and 14 to a mounting plate on a trailer tongue assures that when loaded all of the bolts will be equally stressed to minimize shear force in the plane of the part line 35 between gear box segments 12 and 14, as will be hereinafter more fully explained.

Each gear box segment is partitioned to form a gear box 40 in which worm gear 16 and pinion gear 18 are rotatably disposed, a leg receiving passage 42 and a rack gear receiving passage 44. Gear box segment 40 and rack gear receiving passage 44 are separated by a common partition wall 50 having a window 52 formed therein through which teeth 58 on pinion gear 18 extend to engage teeth 54 on rack gear 24 for moving tubular leg 22 and rack gear 24 longitudinally through passages 24 and 44 formed in the body of the gear box.

Outer walls of the gear box comprise substantially semi-circular walls 62 which extend around a substantial portion of the periphery of leg receiving passage 42. Rack receiving passage 44 is formed between spaced outer walls 64 while gear box segment 40 lies between outer walls 60.

The front edges of semi-cylindrical walls 62 intersect along part line 35 at the front of the body to form a front wall having outwardly projecting lugs 61 thereon having bolt receiving apertures 63 extending therethrough for receiving bolts 65 as will be hereinafter more fully explained.

Common wall 50, having window 52 formed therein, has a semi-cylindrical bearing surface 56 formed therein to support the end of a shaft 76 upon which worm gear 16 is mounted. The common partition wall 50 extends between outer wall portions 44 to form the generally U-shaped rack receiving passage 44.

A rear wall 68 extends between side walls 60 of gear box 40 and has a semi-cylindrical bearing surface 66 formed therein which are axially aligned with bearing surface 56 in common wall 50. As best illustrated in FIG. 6 of the drawing, the lower edge of real wall 68 is curved and extends to intersect a lower portion of common wall 50. Connector lugs 61 having bolt receiving apertures 63 formed therein are provided adjacent upper and lower ends of wall portions 44 to receive bolts 65 for securing segments 12 and 14 of the gear box together. An upper wall 69 extends from the upper end of rear wall 68 and intersects common wall 50, lugs 61 being formed at the intersection therebetween.

As best illustrated in FIG. 6, rear wall 68 is provided with a thickened portion 74 having bolt receiving apertures 73 formed therein adjacent bearing surface 66 to provide a bearing surface 66 which is significantly longer than bearing surfaces of conventional rack and pinion jack gear boxes. This is the general area in which failure of conventional jacks usually occurs. The provision of the elongated bearing surface 66 provides increased support area to assure that loading is distributed to reduce stress concentration. Bolt receiving apertures 73 extend through the thickened portion 74 of rear wall 68 to secure the thickened portions of the rear wall together to minimize the possibility of deflection of rear wall 68 in the vicinity of bearing surfaces 66.

Worm gear 16 is rigidly secured to a shaft 76 rotatably secured in bearing surfaces 56 and 66. Shaft 76 is provided with a crank portion 78 having a handle 75 on the end thereof.

Pinion gear 18 is rotatably mounted on a shaft 28 having opposite ends rotatably secured in hollow cylindrical bosses 80 extending inwardly from outer wall 60 into gear box 40. Each hollow boss 80 is provided with an internal cylindrical opening 86 to form cylindrical bearing surfaces for opposite ends of shaft 28. End surfaces of bosses 80 are positioned adjacent opposite edges of pinion gear 18 such that pinion gear 18 is maintained in a position centered between outer walls 60 in a lower portion of gear box 40, as illustrated in FIGS. 6 and 7 of the drawing.

Gear box segments 12 and 14 are preferably diecast and formed by injecting molten aluminum into a mold cavity and allowed to cool sufficiently to solidify the molten metal to form the gear box segments. The molded gear box segments 12 and 14 are of unitary construction and each segment is provided with a common wall 50 and a rear wall 68 forming gear box 40 therebetween, self contained bearing surfaces 56 and 66 begin formed therein. Outer walls 60, having bosses 80 provided with cylindrical bearing surfaces 86, are formed to extend along opposite sides of gear box 40 to provide self contained bearings for pinion shaft 28 supporting pinion gear 18 in meshing relation with worm gear 16.

The common wall 50, between rack receiving passage 44 and the interior 40 of the gear box, is provided with a window 52 through which teeth 58 on pinion gear 18 extend to engage and mesh with teeth 54 on rack 24.

From the foregoing it should be readily apparent that the provision of die-cast bolt segments 12 and 14 having self contained bearing surfaces 56, 66 and 86 formed therein substantially eliminates the possibility that assembled jack gear boxes will not meet established specifications. The only assembly which is required is positioning of shaft 26 through a central opening in pinion gear 28, positioning the end of the shaft 28 in bearing surface 86 and positioning shaft 76 carrying worm gear 66 in bearing surfaces 56 and 66. The gear box segments are then secured together by bolts 65 to complete the assembly operation.

Gear box 40 is preferably packed with grease before the gear segments are secured together to provide lubrication in the vicinity of bearing surfaces 56, 66 and 86.

It should be readily appreciated that forming gear box segments 12 and 14 of aluminum or other non-corrosive material eliminates the necessity for providing protective coatings to prevent corrosion of the gear box. The interior of the gear box is easily accessible by removing bolts 65 to remove any foreign matter deposited in gear box 40, for example, if the jack is used on the tongue of a boat trailer which may become submerged in water or otherwise become contaminated.

The provision of the thickened portion 74 on rear wall 68 of gear box 40 provides an improved supporting surface 66 to provide reinforcing and increased wear surfaces at the most common point of failure of tongue mounted rack and pinion jacks.

The die-casting process for forming segments 12 and 14 assures that the parts of each jack will be identical and corresponding surfaces precisely located, eliminating the need for skilled labor during the assembly operation.

Having described my invention, I claim:

1. A tongue mounted rack and pinion jack for a trailer, said jack including a leg having a rack gear secured thereto movable through the interior of a gear box, the improvement comprising: a pair of gear box segments, the interior of each of said segments being a mirror image of the interior of the other segment; each segment being of unitary construction; a common wall on each segment forming a gear body and a rack receiving passage, said common wall having a window formed therein through which teeth on the pinion gear mounted in the gear body extend to engage teeth on a rack gear positioned in said rack receiving passage; an outer wall on each gear box segment extending perpendicular to said common wall; a hollow cylindrical boss formed on each outer wall, said boss forming a bearing surface for a shaft supporting the pinion gear; a rear wall on said gear box secured to said outer wall and spaced from said common wall, said common wall and said rear wall having semi-circular bearing surfaces formed therein to receive a shaft having a worm gear mounted thereon and arranged to position teeth on said worm gear in meshing relation with teeth on said pinion gear such that rotation of said worm gear imparts movement through said pinion gear to said rack gear; said rear wall being substantially thicker than said common wall to form a bearing surface in said rear wall which is longer than said bearing surface in said common wall; and means securing said gear body segments together.

2. A tongue mounted rack and pinion jack for a trailer according to claim 1, the shaft upon which the worm gear is mounted comprising: a crank.

3. A tongue mounted rack and pinion jack for a trailer according to claim 1, each of said molded gear box segments having a leg receiving passage formed therein, said leg receiving passage communicating with said rack receiving passage such that rotation of said pinion gear moves said rack gear and said leg longitudinally through said rack receiving passage and said leg receiving passage.

4. A method of making a tongue mounted rack and pinion jack for a trailer comprising: die-casting a pair of gear body segments, each of said segments being a mirror image of the other segment; each segment having a gear box portion, a rack receiving portion, a leg receiving portion, and two pair of bearing surfaces formed therein; mounting a pinion gear on a pinion shaft; positioning one end of said pinion shaft in one of said bearing surfaces of one of said pair of bearing surfaces; positioning a shaft having a worm gear mounted thereon in the second pair of bearing surfaces; the second pair of bearing surfaces being longer than the first pair of bearing surfaces; and securing the gear box segments together.

5. A method according to claim 4, the step of securing the gear box segments together comprising the step of: detachably securing the gear body segments together.

* * * * *

UNITED STATES PATENT AND TRADEMARK OFFICE
CERTIFICATE OF CORRECTION

PATENT NO. : 4,848,735
DATED : July 18, 1989
INVENTOR(S) : Jerry W. Pittman

It is certified that error appears in the above-identified patent and that said Letters Patent is hereby corrected as shown below:

```
Column 4, line 57, change "body" to -- box --;
Column 4, line 60, change "body" to -- box --;
Column 5, line 11, change "body" to -- box --; and
Column 6, line 5, change "body" to -- box --.
```

Signed and Sealed this

Twenty-second Day of May, 1990

Attest:

HARRY F. MANBECK, JR.

*Attesting Officer*      *Commissioner of Patents and Trademarks*